United States Patent
Atieh

(10) Patent No.: US 6,490,380 B2
(45) Date of Patent: Dec. 3, 2002

(54) OPTICAL AMPLIFIER WITH LOOP MIRROR FILTER NOISE REDUCER, AND LOOP MIRROR FILTER PER SE

(75) Inventor: Ahmad Atieh, Nepean (CA)

(73) Assignee: Oprel Technologeis Inc., Ottawa (CA)

( * ) Notice: Subject to any disclaimer, the term of this patent is extended or adjusted under 35 U.S.C. 154(b) by 0 days.

(21) Appl. No.: 09/813,854

(22) Filed: Mar. 22, 2001

(65) Prior Publication Data

US 2001/0024539 A1 Sep. 27, 2001

Related U.S. Application Data

(60) Provisional application No. 60/191,731, filed on Mar. 24, 2000.

(30) Foreign Application Priority Data

Mar. 24, 2000 (CA) ............................................. 2302097

(51) Int. Cl.$^7$ ................................................. G02B 6/26
(52) U.S. Cl. .............................. 385/15; 385/24; 385/47; 359/341.1
(58) Field of Search ................................. 385/11, 15, 24, 385/27, 39, 42, 46, 47; 372/6, 26; 359/341.1, 337.1

(56) References Cited

U.S. PATENT DOCUMENTS

| | | | |
|---|---|---|---|
| 4,839,898 A | 6/1989 | Payne et al. | 372/6 |
| 5,255,274 A * | 10/1993 | Wysocki et al. | 372/26 |
| 5,655,039 A | 8/1997 | Evans | 385/27 |
| 5,689,596 A | 11/1997 | Evans | 385/27 |
| 5,717,797 A | 2/1998 | Evans | 385/27 |
| 5,757,541 A | 5/1998 | Fidric | 359/341 |
| 6,052,393 A | 4/2000 | Islam | 372/6 |
| 6,104,528 A | 8/2000 | Hwang | 359/341 |
| 6,377,391 B1 * | 4/2002 | Vakoc et al. | 359/337.1 |

OTHER PUBLICATIONS

"Loop–mirror filters based on saturable–gain or absorber gratings" Havstad et al., Optics Letters, vol. 24, No. 21, Nov. 1, 1999 pp 1466–1468.

* cited by examiner

*Primary Examiner*—Phan T. H. Palmer
(74) *Attorney, Agent, or Firm*—Neil Teitelbaum

(57) ABSTRACT

In order to reduce amplified spontaneous emission noise in the output signal of an amplifier of the kind in which amplification introduces amplified spontaneous emission, for example an erbium-doped fiber amplifier, the amplified signal is filtered using a loop mirror filter. The loop mirror filter may comprise a 3-dB fiber coupler with a loop of linear active fiber connected between two of its ports. The amplified signal and the filtered signal may be applied to, and extracted from, one of its other ports, conveniently by way of a circulator.

20 Claims, 3 Drawing Sheets

OPTICAL AMPLIFIER WITH LOOP MIRROR FILTER NOISE REDUCER, AND LOOP MIRROR FILTER PER SE

This application claims the benefit of 60/191,731, filed Mar. 24, 2000.

TECHNICAL FIELD

This invention relates to a loop mirror filter that can be used in optical amplifiers of the kind which employ spontaneous emission, such as, for example, erbium-doped fiber amplifiers.

BACKGROUND ART

Optical amplifiers are used in optical telecommunications systems at the transmitter, receiver, and as repeaters or in-line amplifiers. Such optical amplifiers typically use an optical fiber doped with a rare earth element, for example erbium, to provide stimulated emission which is used to amplify the signal. Unfortunately, spontaneous emission occurs, is amplified along with the input signal, and appears as noise in the output signal, reducing the signal-to-noise ratio. It is desirable to improve signal-to-noise ratio by removing or substantially reducing such amplified spontaneous emission (ASE) noise.

In an article entitled "In-band Amplified Spontaneous Emission Noise Filtering with a Dispersion-imbalanced Nonlinear Loop Mirror", OFC 1999, William S. Wong et at. disclosed an experimental set up which reduced noise by means of a non-linear optical loop mirror, i.e. formed by two fibers of different types, and with different lengths. The set up comprised an EDFA and an external ASE generator which injected the input signal and noise, respectively, via a 3-dB coupler and a circulator, into a dispersion-imbalanced loop mirror formed by another 50/50 coupler, two lengths of "Lucent TrueWave" optical fiber having different anomalous dispersion characteristics, and a polarization controller. The polarization controller was used to null loop transmissions at low power so as to minimize the effects of natural birefringence. The signal from the loop mirror was ported to a lightwave receiver which performed bit error rate measurements. A disadvantage of Wong et al.'s design is that the loop mirror is formed by a transmission line, which is about 24 km long. While this might be acceptable in an experimental set-up, it is not practical or useful in a real system. Also, Wong et al. must use high power levels to exploit the non-linearity of the fiber used in the loop in order to achieve transmission of the signal.

Japanese patent application No. 11087822A, published Mar. 30, 1999, owned by Samsung Electron Co. Ltd., and naming Wang Hwang Seong-Taek as inventor, disclosed an arrangement for providing a high small-signal gain in an erbium-doped fiber amplifier. Seong-taek disclosed an EDFA comprising a circulator, a wavelength selective coupler, a laser diode pump and an erbium-doped fiber connected to a loop mirror by a coupler. The amplified signal from the EDF is reflected by the loop mirror so that it passes through the EDF again, but in the opposite direction. A disadvantage of this arrangement is that, although gain might be increased, overall signal-to-noise ratio will deteriorate because the signal will pass through the amplifier twice, incurring spontaneous emission noise penalties each time.

The present invention seeks to eliminate or at least mitigate these disadvantages of known systems.

DISCLOSURE OF INVENTION

According to one aspect of the present invention, an optical amplifier comprises an amplifier section for amplifying an input signal by means producing spontaneous emission amplified signal and a loop mirror filter for filtering the amplified signal to remove amplified spontaneous emission.

Preferably, the loop mirror filter comprises a 3-dB coupler and a loop of optical fiber having an active section. Optionally, the loop mirror filter includes a circulator for directing the amplified signal and the filtered signal to and from the loop of fiber. Preferably, the loop of optical fiber is relatively short, say less than 5 meters.

BRIEF DESCRIPTION OF THE DRAWINGS

Embodiments of the invention will now be described by way of example only and with reference to the accompanying drawings in which.

BEST MODES FOR CARRYING OUT THE INVENTION

Figure 1:
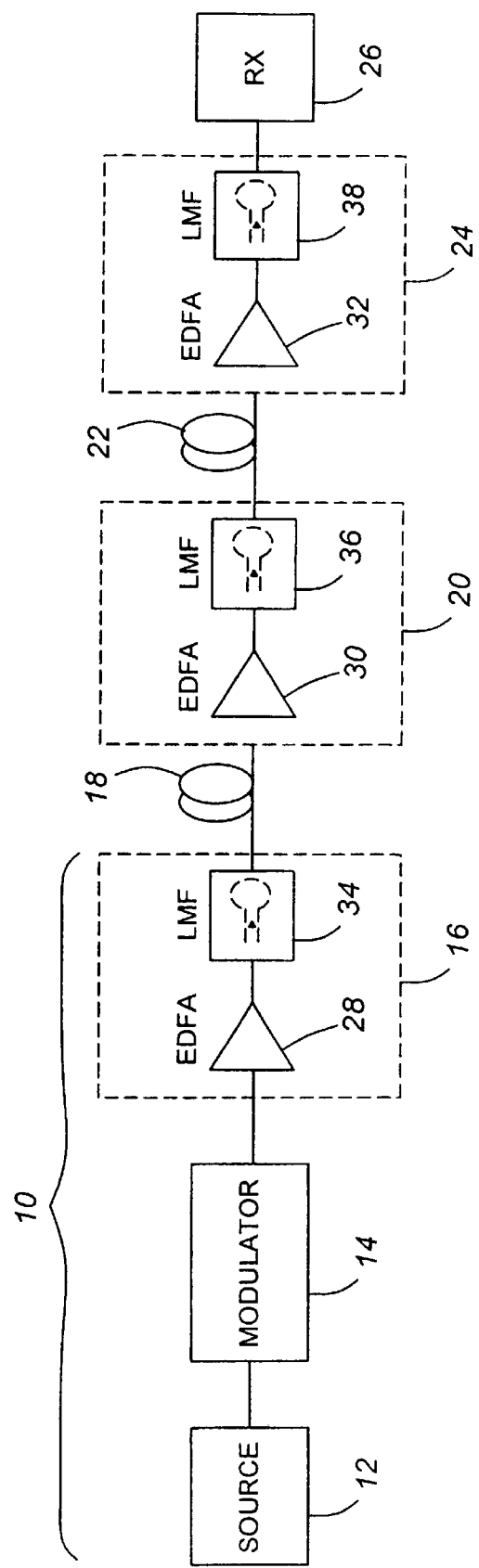
FIG. 1 illustrates an optical telecommunications system comprising a transmitter, a repeater and a receiver, each of which includes an optical amplifier comprising an EDFA stage and a loop mirror filter.

Referring to FIG. 1, an optical telecommunications system comprises a transmitter section 10 comprising a light source 12, conveniently a laser source producing continuous wave (CW) light, a modulator 14, conveniently a lithium niobate device, and an optical power amplifier 16. The modulator 14 is connected between the light source 12 and the input of power amplifier 16 and modulates the CW light with the data to be transmitted. The output of the power amplifier 16 is connected by an optical fiber transmission line 18 to an in-line (repeater) amplifier 20, which is connected in turn by a second optical fiber transmission line 22 to a preamplifier 24, the output of which is connected to a receiver section 26 for extraction of the data in a known manner.

The power amplifier 16, in-line amplifier 20 and preamplifier 24 comprise erbium-doped fiber amplifier stages (EDFAs) 28, 30 and 32, respectively, and loop mirror filters (LMFs) 34, 36 and 38, respectively. The LMFs 34, 36 and 38 remove amplified spontaneous emission (ASE) generated within the EDFAs 28, 30 and 32, respectively. It will be appreciated that the in-line amplifier 20 is optional, the need for it depending upon the distance between the transmitter and the receiver.

The signal level at the input of the power amplifier 16 will be quite high, whereas the signal at the input of the preamplifier 24 and, possibly, that at the input of the in-line amplifier 20, will be relatively small. Consequently, the characteristics of the three EDFAs 28, 30 and 32 may be different. The LMFs 34, 36 and 38, however, may be identical. Since the three amplifiers are substantially identical, only the power amplifier 16 will now be described with reference to FIG. 2, which shows the EDFA 28 and the LMF 34 in more detail.

Figure 2:
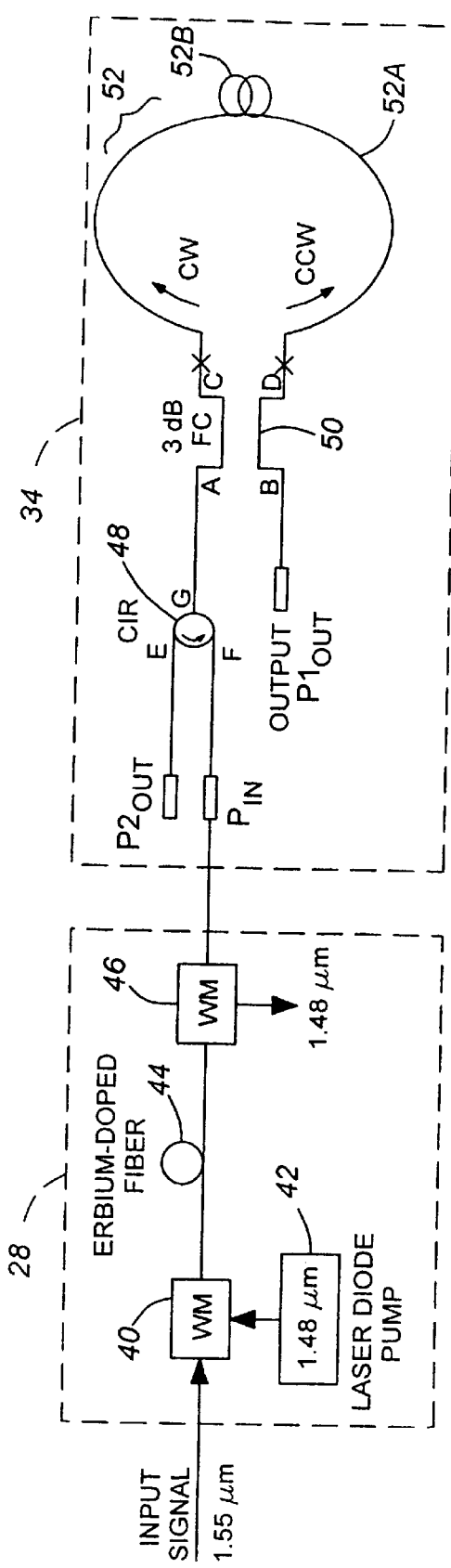
FIG. 2 illustrates one of the optical amplifiers in more detail in accordance with the instant invention.

As shown in FIG. 2, the EDFA 28 comprises a first wavelength selective coupler 40, for combining the input signal with energy from a pump source 42 and applying it to one end of an erbium-doped fiber (EDF) 44. Within the EDF 44, pump energy is transferred to the input signal causing amplification in known manner. The other end of the EDF 44 is connected to a wavelength demultiplexer 46 which extracts residual pump energy and supplies the amplified a signal to input port $P_{IN}$ of the LMF 34. It should be appreciated that other kinds of EDFA could be employed, such as those disclosed in the present applicant's patent application Ser. No. 60/191,730.

The LMF 34 comprises a circulator 48, a coupler 50 having four ports identified as A, B, C and D, and a loop of optical waveguide 52 connected between ports C and D of the coupler 50, which is preferably a 3-dB fiber coupler, such as a 1550 nm 3-dB fiber coupler. The loop of optical waveguide comprises an optical fiber 52A, such as that marketed as type SMF-28 by Corning Inc., and an active section, such as an erbium-doped fiber 52B. Typically, the total length of linear active fiber 52 is as short as possible to avoid polarization fluctuations. For example, the total length is typically on the order of 5 meters, and preferably is under 10 metres. Advantageously, the linear active fiber 52 is short relative to optical fibers used in non-linear loops, which for example, are in the order of hundreds of meters.

The other two ports A and B of the coupler 50 are connected to a bidirectional port G of the circulator 48 and a first output port $P1_{OUT}$ of the LMF 34, respectively. The circulator 48 has a unidirectional input port F and a unidirectional output port E connected to the input port $P_{IN}$ and a second output port $P2_{OUT}$ respectively. Preferably, the circulator 48 has more than 45 dB isolation and 0.8 dB insertion loss between its ports.

Optionally, the performance of the optical amplifier 16 is enhanced, especially for low input signal power, by inserting an isolator (not shown) between the output of EDFA 28 and the input of LMF 34 to avoid or reduce Rayleigh back scattering.

In another embodiment, an improvement in overall noise figure is achieved by using polarization maintaining components including polarization-maintaining fiber. Additionally or alternatively, a polarization controller (not shown) and an inline polarizer are conveniently added between the circulator 48 and the coupler 50 to improve eliminating ASE from the signal. If a polarization controller is used, the EDFA need not use polarization-maintaining components or be constrained to provide a particular state of polarization.

In operation, the amplified optical signal leaving the circulator 48 via port G and entering port A of the coupler 50 is a coherent signal and has a certain phase. The coupler 50 splits the signal equally into 50 per cent signals CW and CCW which leave the coupler 50 via its output ports C and D, respectively, so that they propagate in opposite directions around the loop of fiber 52. The signal CW propagating clockwise (as shown) in the loop 52 will be in phase with the signal at port A. The signal CCW leaving port D and propagating counterclockwise will be phase-shifted through $\pi/2$ radians relative to the clockwise signal CW. This phase difference is attributed to the fact that light coupled across a coupler undergoes a $\pi/2$ radian phase shift relative to light coupled straight through. When the CW and CCW signals arrive back at the opposite ports D and C, respectively, they pass through the fiber coupler 50 again to produce an output signal at port A substantially equal to the sum of the CW and the CCW signals and having a phase shift of $\pi/2$ radians relative to the input signal. In other words, since the CW and CCW components propagate through the same optical path, a relative phase shift therebetween is not produced. However, a phase shift of $\pi/2$ is observed between the input and output signals due to the presence of the coupler 50. This reflected output signal appearing at port A is a result of the interference within the coupler 50. It is directed from port A to port G of the circulator 48, where it is output via output port $P2_{OUT}$. In theory, there should be no output of the signal from output port $P1_{OUT}$ because the whole signal energy should be reflected in the loop mirror formed by fiber 52 and the coupler 50. In practice, there may be some slight leakage because the coupler 50 will not split at exactly 50 per cent.

Similarly, the ASE noise that is generated by the EDFA 28, is split into 50 percent signals corresponding to CW and CCW components that propagating in opposite directions around the loop of the optical fiber 52 and, appear at port A along with the reflected signal.

However, when the amplified signal and ASE pass through the active fiber 52b in the linear active loop 52, the ASE is used to pump the amplified signal, thus effectively filtering out some of the ASE and simultaneously further amplifying the amplified signal.

In other words, the presence of the active fiber within the linear loop results in energy transfer from the ASE to the optical signal, thus reducing the amount of ASE at the signal wavelength and simultaneously compensating for the LMF insertion loss i.e., the insertion loss resulting from the incorporation of the circulator and coupler 50. The more ASE accompanying the amplified signal the more energy is transferred from the ASE to the signal. Since the amplifying section 28 generates more ASE for lower input power levels than higher, the instant invention is particularly useful for low power applications.

Advantageously, the presence of the erbium-doped fiber 52B reduces the amount of ASE at the signal wavelength and simultaneously increases the signal power to improve the signal-to-noise ratio. Of course, the erbium-doped section of the optical waveguide 52 could be replaced with another active section. For example, a fiber doped with another rare earth, or combination of rare earths, is also within the scope of the instant invention.

Figure 3:
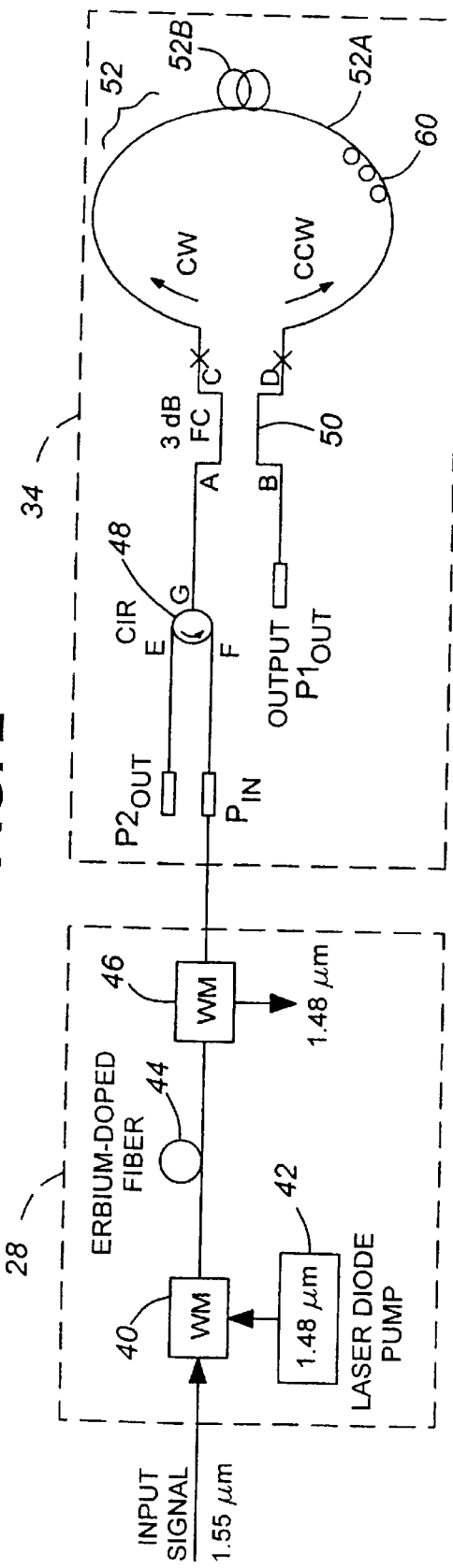
FIG. 3 illustrates an embodiment of the optical amplifier shown in FIG. 2 including a polarization controller.
Figure 4:
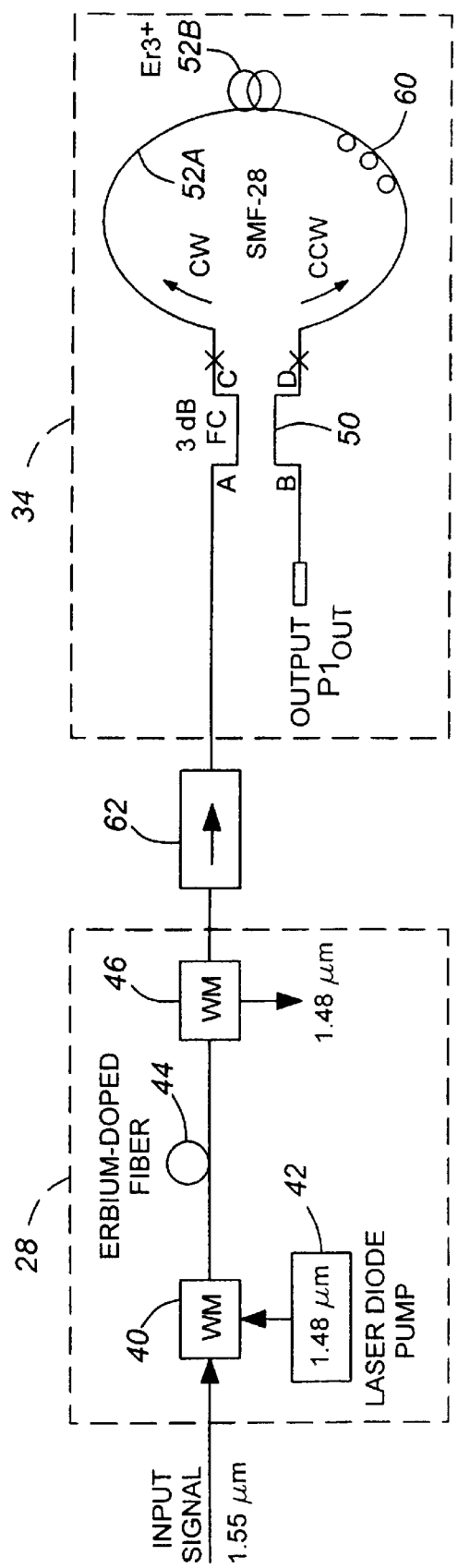
FIG. 4 illustrates yet another embodiment of the optical amplifier shown in FIG. 2.

Referring to FIG. 3, there is shown a preferred embodiment of the amplifier 16, wherein the linear LMF 34 includes a polarization controller 60. Preferably, the polarization controller 60 uses variable birefringence to control the power levels between $P1_{OUT}$ and $P2_{OUT}$ and/or to determine the amount of ASE filtering. For example, the polarization controller 60 could be adjusted to direct all of the amplified signal to the fourth port B of the coupler 50, to $P1_{OUT}$ or alternatively could be adjusted to tap some of the optical signal, say about 10%. In the former case, the circulator 48 could be replaced by an isolator 62, as shown in FIG. 4. A second isolator (not shown) might then be inserted between the coupler 50 and the output port $P1_{OUT}$ to prevent backreflected light into the EDFA, hence improving the noise figure. All other components are similar to the components described with respect to FIG. 2.

It should be appreciated that the above-described noise reduction technique using a loop mirror filter is not limited to use with erbium-doped fiber amplifiers, but is applicable in any optical system that produces noise and can benefit by its removal so as to improve the signal to noise ratio. For example, the loop mirror filter could be used with other active or rare-earth doped fiber amplifiers. Accordingly, the invention encompasses a loop mirror filter per se.

INDUSTRIAL APPLICABILITY

An advantage of optical amplifiers according to the present invention, at least as compared with that disclosed by Wong et al. is that they use a loop mirror fiber that typically is less than 5 m, and may be an ordinary single mode filter having an active section. Furthermore, a polarization controller is not essential. Moreover, the instant invention works best for low power input signal, in contrast to non-linear fiber loop mirrors, which need high power input signals and optical fibers with specified dispersion parameters to initiate fiber nonlinearities.

Because optical amplifiers according to the present invention pass the signal through the EDF once only, they should yield better signal-to-noise ratios than, for example, that disclosed in the aforementioned Japanese patent application No. 11087822A.

What is claimed is:

1. A loop mirror filter including an optical waveguide having an active section and an optical coupler having first, second, and third ports, the first port for receiving an optical signal having a signal component and a noise component, the second and third ports for coupling to the optical waveguide to provide a linear active loop for increasing a signal-to-noise ratio of the optical signal, wherein the loop mirror filter is configured such that only the signal component and the noise component are transmitted through the active section.

2. A loop mirror filter according to claim 1, wherein the optical waveguide is an optical fiber and the active section comprises a rare-earth doped fiber.

3. A loop mirror filter according to claim 2, further comprising a polarization controller.

4. A loop mirror filter according, to claim 2, wherein the coupler is a 3 dB fiber coupler including a fourth port for outputting at least a portion of the optical signal having the increased signal-to-noise ratio.

5. A loop mirror filter according to claim 2, further comprising a circulator for separating input and output signals from the first port of the coupler.

6. A loop mirror filter comprising:
an optical waveguide having an active section; and
an optical coupler having first, second and third ports, the first port for receiving an amplified optical signal and amplified spontaneous emission from an output port of an amplifying section, the second and third ports for coupling to the optical waveguide to form a loop such that each of the amplified optical signal and amplified spontaneous emission received at the first port are divided into first and second sub-signals that are transmitted from the second and third ports, respectively, to counter-propagate about the loop and return to the optical coupler, wherein the active section provides means for transferring energy from the amplified spontaneous emission to the amplified optical signal.

7. A loop mirror filter according to claim 6, wherein the optical waveguide is an optical fiber and the active section comprises a rare-earth doped fiber.

8. A loop mirror filter according to claim 7, wherein the optical coupler is a 3 dB fiber coupler including a fourth port.

9. A loop mirror filter according to claim 8, further comprising a polarization controller in the loop.

10. A loop mirror filter according to claim 9, wherein the polarization controller is adjustable to direct at least a portion of the amplified optical signal and amplified spontaneous emission returned to the optical coupler to the fourth port thereof.

11. A loop mirror filter according to claim 10, further comprising a circulator for optically coupling the first port of the optical coupler to the output port of the amplifying section.

12. A loop mirror filter according to claim 10, further comprising an isolator for optically coupling the first port of the optical coupler to the output port of the amplifying section.

13. An optical amplifier comprising:
an amplifying section having an input port for receiving an input optical signal and an output port for providing an amplified optical signal and amplified spontaneous emission resulting from amplification of the input signal;
a loop mirror filter including an optical waveguide having an active section and an optical coupler having first, second and third ports, the first port for optically coupling to the output port of the amplifying section, the second and third ports for coupling to the optical waveguide to form a linear active loop for filtering the amplified optical signal to increase a signal-to-noise ratio thereof.

14. An optical filter according to claim 13, further comprising a polarization controller disposed in the loop mirror filter.

15. An optical filter according to claim 14, wherein the coupler is a 3 dB coupler including a fourth port.

16. An optical filter according to claim 15, wherein the polarization controller is adjustable to direct at least a portion of the filtered optical signal to the fourth port of the coupler.

17. An optical filter according to claim 16, further comprising an isolator for optically coupling the first port of the optical coupler to the output port of the amplifying section.

18. An optical amplifier according to claim 17, wherein the amplifying section comprises an active fiber optically coupled to the input port, a pump source optically coupled to the active fiber for pumping the active fiber, and a wavelength demultiplexer for extracting residual pump energy such that substantially no pump energy reaches the output port and is transmitted through the active section of the loop mirror filter.

19. An optical filter according to claim 13, further comprising a circulator for optically coupling the first port of the optical coupler to the output port of the amplifying section.

20. An optical amplifier according to claim 19, wherein the amplifying section comprises an active fiber optically coupled to the input port, a pump source optically coupled to the active fiber for pumping the active fiber, and a wavelength demultiplexer for extracting residual pump energy such that substantially no pump energy reaches the output port and is transmitted through the active section of the loop mirror filter.

* * * * *

UNITED STATES PATENT AND TRADEMARK OFFICE
CERTIFICATE OF CORRECTION

PATENT NO. : 6,490,380 B2
DATED : December 3, 2002
INVENTOR(S) : Atieh

It is certified that error appears in the above-identified patent and that said Letters Patent is hereby corrected as shown below:

Column 1,
Lines 9-10, "spontaneous emission" should read -- stimulated emission --

Column 2,
Lines 1-2, "spontaneous emission" should read -- stimulated emission --

Signed and Sealed this

Fifteenth Day of April, 2003

JAMES E. ROGAN
*Director of the United States Patent and Trademark Office*